United States Patent

Bourbeau

[15] 3,681,676

[45] Aug. 1, 1972

[54] CYCLOCONVERTER SILICON CONTROLLED RECTIFIER GATE SIGNAL INHIBIT CIRCUIT

[72] Inventor: Frank J. Bourbeau, Santa Barbara, Calif.

[73] Assignee: General Motors Corporation, Detroit, Mich.

[22] Filed: April 21, 1971

[21] Appl. No.: 135,842

[52] U.S. Cl. ........................321/11, 321/13, 321/66, 307/252 N, 318/227

[51] Int. Cl. ..........................H02m 1/18, H02m 5/30

[58] Field of Search ......321/13, 60, 61, 65, 66, 69 R, 321/11; 307/252 N, 252 P, 252 Q; 318/227

[56] References Cited

UNITED STATES PATENTS 3,525,030 8/1970 Hammond et al. ...........321/13 X 3,539,900 11/1970 Chausse et al. ..................321/60

3,546,483 12/1970 Lundin......................307/252 N 3,622,806 11/1971 Williams ...................307/252 N

*Primary Examiner*—William H. Beha, Jr.

*Attorney*—Eugene W. Christen, Creighton R. Meland and Richard G. Stahr

[57] ABSTRACT

In a cycloconverter system, a gate signal inhibit circuit for maintaining the gate signal circuit of a corresponding cycloconverter silicon controlled rectifier interrupted when the forward anode-cathode potential thereacross is of a magnitude greater than a predetermined maximum. The collector-emitter electrodes of a switching transistor, responsive to a gate signal for collector-emitter conduction, are connected in series in the gate signal circuit of the corresponding cycloconverter silicon controlled rectifier. A sensing potential, of a magnitude proportional to the magnitude of the forward anode-cathode potential across the corresponding cycloconverter silicon controlled rectifier, is applied across the base-emitter electrodes of the switching transistor in an inverse polarity relationship to maintain the switching transistor not-conductive when the forward anode-cathode potential across the corresponding cycloconverter silicon controlled rectifier is of a magnitude greater than a predetermined maximum.

4 Claims, 2 Drawing Figures

Figure 1:
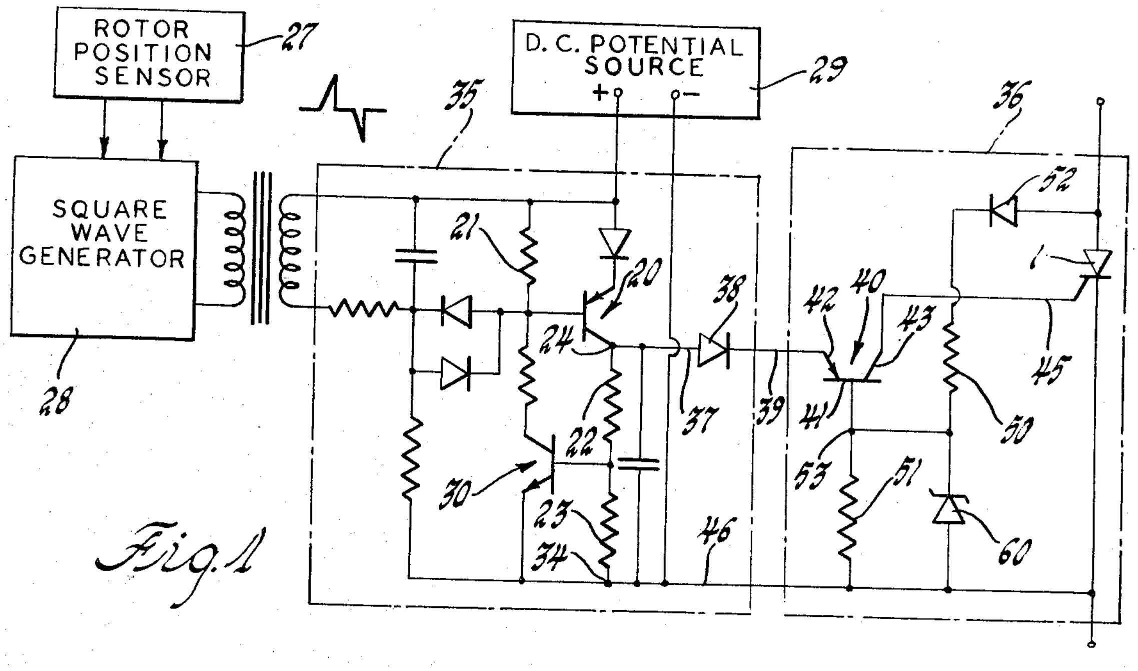

INVENTOR.
Frank J. Bourbeau
BY
Richard G. Stahr
ATTORNEY

CYCLOCONVERTER SILICON CONTROLLED RECTIFIER GATE SIGNAL INHIBIT CIRCUIT

The invention herein described and claimed was made in the course of work under contract or subcontract thereunder with the Department of Defense.

This invention is directed to gate signal inhibit circuits and, more specifically, to a cycloconverter silicon controlled rectifier gate signal inhibit circuit for maintaining the gate signal circuit of the corresponding cycloconverter silicon controlled rectifier interrupted when the forward anode-cathode potential thereacross is of a magnitude greater than a predetermined maximum.

Heretofore, alternating current motors have been considered primarily as constant speed machines. As the synchronous speed of motors of this type is directly proportional to the frequency of the alternating current supply potential, the speed may be varied by changing the frequency of the alternating current supply potential. With the introduction of silicon controlled rectifiers, practical cycloconverter type supply potential frequency changers comprised of a network of silicon controlled rectifiers have come into increasing use for the purpose of selectively changing the frequency of the alternating current supply potential of alternating current motors. In conventional cycloconverter motor drive systems, the silicon controlled rectifiers of the cycloconverter network are gated on at random points in each cycle of the alternating current supply potential. Consequently, the anode-cathode potential appearing across any cycloconverter silicon controlled rectifier may be of any value between the negative and positive polarity extremes when the gate signal is applied across the gate-cathode electrodes thereof. Should any of the cycloconverter silicon controlled rectifiers be gated on when the forward anode-cathode potential appearing thereacross is high, 300 volts, for example, and if this silicon controlled rectifier reaches full conduction in one microsecond, a time which is not unusual with modern silicon controlled rectifiers, the adjacent silicon controlled rectifier would experience a positive rate of change of anode-cathode potential of approximately 300 volts per microsecond. This extremely high dv/dt may trigger the adjacent silicon controlled rectifier conductive through the anode-cathode electrodes thereof to place a direct short circuit across the supply potential.

It is, therefore, an object of this invention to provide a cycloconverter silicon controlled rectifier gate signal inhibit circuit for maintaining the gate signal circuit of a corresponding cycloconverter silicon controlled rectifier interrupted when the forward anode-cathode potential across the silicon controlled rectifier is of a magnitude greater than a predetermined maximum.

In accordance with this invention, a cycloconverter silicon controlled rectifier gate signal inhibit circuit for maintaining the gate signal circuit of a corresponding cycloconverter silicon controlled rectifier interrupted when the forward anode-cathode potential across the silicon controlled rectifier is of a magnitude greater than a predetermined maximum is provided wherein the current carrying electrodes of a switching transistor are connected in series in the gate signal circuit of the corresponding cycloconverter silicon controlled rectifier, the gate signal is applied across the base-emitter electrodes of the switching transistor in a forward poled relationship and a sensing potential, of a magnitude proportional to the magnitude of the forward anode-cathode potential across the corresponding cycloconverter silicon controlled rectifier, is applied across the base-emitter electrodes of the switching transistor in an inverse polarity relationship for maintaining the switching transistor not conductive when the forward anode-cathode potential across the corresponding cycloconverter silicon controlled rectifier is of a magnitude greater than a predetermined maximum.

Figure 2:
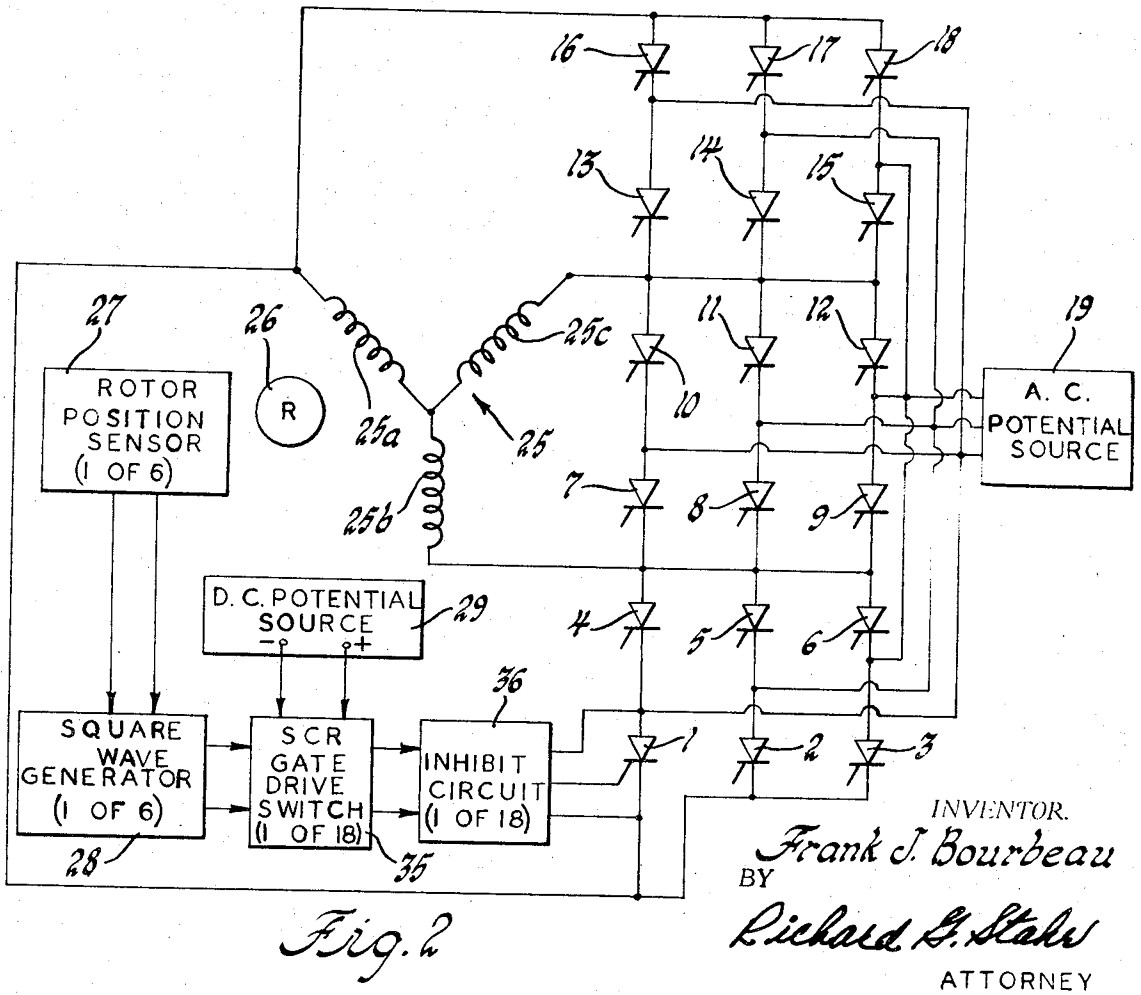

For a better understanding of the present invention, together with additional objects, advantages and features thereof, reference is made to the following description and accompanying drawings in which:

FIG. 1 sets forth the novel cycloconverter silicon controlled rectifier gate signal inhibit circuit of this invention in schematic form, and FIG. 2 sets forth, partially in schematic and partially in block form, a cycloconverter system for operating an alternating current motor at a variable speed.

In FIGS. 1 and 2 of the drawing, like elements have been given like numerals of reference.

Referring to FIG. 2 of the drawings, a typical cycloconverter system for operating a three-phase alternating current motor at variable speed is set forth partially in schematic and partially in block form. The cycloconverter circuit is comprised of a network of 18 silicon controlled rectifiers, referenced by the numerals 1 through 18, inclusive, interposed between a conventional alternating current supply potential source 19 and a three-phase, alternating current motor 25 having three "wye" connected phase windings 25*a*, 25*b* and 25*c* and a rotor 26. As the alternating current supply potential source may be any one of several well known in the art and, per se, forms no part of this invention, it has been indicated in FIG. 2 in block form. So that silicon controlled rectifier gate signals may be applied to the proper silicon controlled rectifiers of the cycloconverter network at the proper time, six rotor position sensors may be employed. The rotor position sensors are preferably of the type shown in the U.S. Pats. to Campbell et al. No. 3,320,565, and Huntzinger et al. No. 3,395,328, or to Kirk, No. 3,483,458, all of which are assigned to the assignee of this application. It is to be specifically understood, however, that the gate signals may also be derived from a variable frequency oscillator and ring counter in a manner well known in the art without departing from the spirit of the invention. One rotor position sensor which, per se, forms no part of this invention is illustrated in the drawing in block form and is referenced by the numeral 27. The output of rotor position sensor 27 is applied to a corresponding square wave generator 28 which may be a conventional bistable multivibrator circuit which converts the rotor position sensor pulse into a square waveform. As bistable multivibrator circuits are well known in the art and, per se, form no part of this invention, the square wave generator has been illustrated in block form in FIG. 2. The square wave generator output is applied to a silicon controlled rectifier gate drive switch 35 of the type which produces an output potential gate signal. One example of a silicon controlled rectifier gate drive switch suitable for use with the gate signal inhibit circuit of this invention is set forth in schematic form within dashed rectangle 35 of FIG. 1. Interposed between the silicon controlled rectifier gate drive switch 35 and the corresponding cycloconverter silicon controlled rectifier is the gate inhibit circuit 36 of this invention which is set forth in schematic form within dashed rectangle 36 of FIG. 1. The operating potential for silicon controlled rectifier gate switch 35 may be supplied by any conventional direct current potential source which, since it forms no part of this invention, has been illustrated in the drawing in block form and referenced by the numeral 29.

In cycloconverter systems of this type, six rotor position sensors and six corresponding square wave generators, each of which supplies three silicon controlled gate drive switches, are employed and each of the 18 silicon controlled rectifiers in the cycloconverter network is triggered by a corresponding silicon controlled rectifier gate drive switch through a gate signal inhibit circuit of this invention. In the interest of reducing drawing complexity and since all of the silicon controlled rectifier gate circuit switches and all of the inhibit circuits of this invention are identical, only one rotor position sensor, one square wave generator, one silicon controlled rectifier gate drive switch and one inhibit circuit has been shown in each of FIGS. 1 and 2.

Referring to FIG. 1, the gate signal inhibit circuit of this invention is set forth in a cycloconverter system in combination with a silicon controlled rectifier gate switch 35 of the type which produces an output potential gate signal, a corresponding cycloconverter silicon controlled rectifier 1 having anode, cathode and gate electrodes and a gate signal circuit through which the silicon controlled rectifier gate switch output potential signal is applied across the gate-cathode electrodes of the corresponding cycloconverter silicon controlled rectifier in a forward polarity relationship which will be described later in this specification.

The square wave output signal from square wave generator 28 is transformer coupled to the input circuit of silicon controlled rectifier drive switch 35. Consequently, each input wave-form to the silicon controlled rectifier gate drive switch 35 is two opposite polarity pulses separated by a duration of time determined by the width of the square wave output of square wave generator 28, as is illustrated in FIG. 1. Type PNP transistor 20 is normally not conductive as the potential drop across resistor 21 is of an insufficient magnitude to overcome the emitter-base breakdown potential of transistor 20. While transistor 20 is not conducting, the base-emitter circuit of type NPN transistor 30 is interrupted thereby, consequently, type NPN transistor 30 is also normally not-conducting. The positive polarity input signal pulse is applied across the emitter-base electrodes of type PNP transistor 20 in the proper polarity relationship to produce base-emitter current flow through a type PNP transistor, consequently, this device conducts through the emitter-collector electrodes. The resulting emitter-collector current flow through type PNP transistor 20 produces a potential drop across series resistors 22 and 23, which is the output potential gate signal of silicon controlled rectifier gate drive switch 35, and supplies base-emitter drive current for type NPN transistor 30. The resulting collector-emitter current flow through type NPN transistor 30 maintains the circuit for base-emitter drive current through type PNP transistor 20, consequently, transistor 20 remains conductive at the conclusion of the positive polarity excursion of the input signal pulse. The negative polarity input signal pulse is applied across the base-emitter electrodes of the type PNP transistor 20 in an inverse polarity relationship, consequently, the negative polarity input signal pulse extinguishes transistor 20 to remove the output potential gate signal from across series resistors 22 and 23 and interrupts the base-emitter circuit for transistor 30 to extinguish this device.

To produce a sensing potential signal of a magnitude proportional to the magnitude of the forward anode-cathode potential across the corresponding cycloconverter silicon controlled rectifier 1, resistors 50 and 51 are connected in series across the anode-cathode electrodes of cycloconverter silicon controlled rectifier 1 through diode 52 and lead 46. With a forward anode-cathode potential across silicon controlled rectifier 1, the anode electrode of a positive polarity with respect to the cathode electrode, current flows through diode 52 and series connected resistors 50 and 51. The resulting potential drop across resistor 51 is of a positive polarity upon junction 53 with respect to lead 46 and of a magnitude proportional to the magnitude of the forward anode-cathode potential across silicon controlled rectifier 1.

A potential sensitive switching device having current carrying elements connected in the gate signal circuit and responsive to the silicon controlled rectifier gate switch output potential gate signal for establishing the gate signal circuit and to the sensing potential signal for maintaining the gate signal circuit interrupted when the forward anode-cathode potential across the corresponding cycloconverter silicon controlled rectifier is of a magnitude greater than a predetermined maximum is provided.

Without intention or inference of a limitation thereto, as any potential sensitive switching device may be employed, this potential sensitive switching device may be a type PNP switching transistor 40 having a control or base electrode 41 and two current carrying electrodes, emitter electrode 42 and collector electrode 43. The current carrying elements, the emitter-collector electrodes, of switching transistor 40 are connected in series in the gate signal circuit as will hereinafter be described and the base electrode 41 is connected to junction 53 between series connected resistors 50 and 51.

The output potential gate signal of silicon controlled rectifier gate drive switch 35 which appears across series resistors 22 and 23 while transistor 20 is conducting through the anode-cathode electrodes thereof is of a positive polarity upon junction 24 with respect to junction 34. This gate signal is applied across the gate-cathode electrodes of silicon controlled rectifier 1 in a forward polarity relationship through a gate signal circuit which may be traced from junction 24, through lead 37, diode 38, lead 39, the emitter-collector electrodes of switching transistor 40 and lead 45 to the gate electrode of silicon controlled rectifier 1 and from junction 34 through lead 46 to the cathode electrode of silicon controlled rectifier 1.

The output potential gate signal of silicon controlled rectifier gate drive switch 35 is also applied across the emitter-base electrodes of type PNP switching transistor 40 in a forward polarity relationship through lead 37, diode 38 and lead 39, to emitter electrode 42 of switching transistor 40 and through lead 46 and resistor 51 to base electrode 41 of switching transistor 40.

Upon the appearance of a silicon controlled rectifier gate switch output potential gate signal across junctions 24 and 34 with the forward anode-cathode potential, anode electrode positive with respect to the cathode electrode, across corresponding cycloconverter silicon controlled rectifier 1 of a magnitude less than the predetermined maximum, the gate signal produces emitter-base current through type PNP transistor 40 to trigger this device conductive through the emitter-collector electrodes thereof. With transistor 40 conducting through the emitter-collector electrodes, the gate signal produces gate current through corresponding cycloconverter silicon controlled rectifier 1 to trigger this device conductive through the anode-cathode electrodes thereof.

Upon the appearance of a silicon controlled rectifier gate switch output potential gate signal across junctions 24 and 34 with the forward anode-cathode potential across corresponding cycloconverter silicon controlled rectifier 1 of a magnitude greater than the predetermined maximum, the sensing potential appearing across resistor 51 is of a magnitude greater than the gate signal. As this sensing potential signal is applied across the emitter-base electrodes of type PNP switching transistor 40 in an inverse polarity relationship, this device is not triggered conductive, consequently, the gate signal is not applied across the gate-cathode electrodes of corresponding cycloconverter silicon controlled rectifier 1.

Series resistors 50 and 51 are so proportioned that, with the forward anode-cathode potential across corresponding cycloconverter silicon controlled rectifier 1 of a magnitude substantially equal to the predetermined maximum, the magnitude of the sensing signal appearing across resistor 51 is of a sufficient magnitude to prevent emitter-base current flow through type PNP switching transistor 40 with the appearance of a gate signal across junctions 24 and 34.

Zener diode 60 is connected across the junction between series resistors 50 and 51 and line 46 to prevent an abnormally high positive polarity potential upon the base electrode 41 of type PNP switching transistor 40. Consequently, Zener diode 60 should be selected to have an inverse breakdown potential of a magnitude substantially equal to the magnitude of the sensing potential appearing across resistor 51 with a forward anode-cathode potential across corresponding cycloconverter silicon controlled rectifier 1 of a magnitude substantially equal to the predetermined maximum.

Diode 52 is a blocking diode which prevents damage to switching transistor 40 when the anode-cathode potential of corresponding cycloconverter silicon controlled rectifier 1 becomes reversed, anode electrode negative with respect to the cathode electrode.

While specific circuit elements and electrical polarities have been set forth in this specification, it is to be specifically understood that alternate circuit elements possessing similar electrical characteristics and compatible electrical polarities may be substituted therefor without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. In a cycloconverter system, a gate signal inhibit circuit for maintaining the gate signal circuit of a corresponding cycloconverter silicon controlled rectifier interrupted when the anode-cathode potential across the silicon controlled rectifier is of a magnitude greater than a predetermined maximum comprising in combination with a silicon controlled rectifier gate switch of the type which produces an output potential gate signal, a corresponding cycloconverter silicon controlled rectifier having anode, cathode and gate electrodes and a gate signal circuit through which the silicon controlled rectifier gate switch output potential signal is applied across the gate-cathode electrodes of the corresponding cycloconverter silicon controlled rectifier in a forward polarity relationship, means for producing a sensing potential signal of a magnitude proportional to the magnitude of the anode-cathode potential across said corresponding cycloconverter silicon controlled rectifier, and a potential sensitive switching device having current carrying elements connected in said gate signal circuit and responsive to said silicon controlled rectifier gate switch output potential gate signal for establishing said gate signal circuit and to said sensing potential signal for maintaining said gate signal circuit interrupted when the forward anode-cathode potential across said corresponding cycloconverter silicon controlled rectifier is of a magnitude greater than a predetermined maximum.

2. In a cycloconverter system, a gate signal inhibit circuit for maintaining the gate signal circuit of a corresponding cycloconverter silicon controlled rectifier interrupted when the anode-cathode potential across the silicon controlled rectifier is of a magnitude greater than a predetermined maximum comprising in combination with a silicon controlled rectifier gate switch of the type which produces an output potential gate signal, a corresponding cycloconverter silicon controlled rectifier having anode-cathode and gate electrodes and a gate signal circuit through which the silicon controlled rectifier gate switch output potential signal is applied across the gate-cathode electrodes of the corresponding cycloconverter silicon controlled rectifier in a forward polarity relationship, means for producing a sensing potential signal of a magnitude proportional to the magnitude of the anode-cathode potential across said corresponding cycloconverter silicon controlled rectifier, at least one switching transistor having two current carrying electrodes connected in series in said gate signal circuit and a control electrode, means for applying said silicon controlled rectifier gate switch output potential gate signal across a selected one of said current carrying electrodes and said control electrode of said switching transistor in a forward polarity relationship, and means for applying said sensing potential across said selected one of said current carrying electrodes and said control electrode of said switching transistor in an inverse polarity relationship whereby said switching transistor is maintained not conductive when the forward anode-cathode potential across said corresponding cycloconverter silicon controlled rectifier is of a magnitude greater than a predetermined maximum.

3. In a cycloconverter system, a gate signal inhibit circuit for maintaining the gate signal circuit of a corresponding cycloconverter silicon controlled rectifier interrupted when the anode-cathode potential across the silicon controlled rectifier is of a magnitude greater than a predetermined maximum comprising in combination with a silicon controlled rectifier gate switch of the type which produces an output potential gate signal, a corresponding cycloconverter silicon controlled rectifier having anode, cathode and gate electrodes and a gate signal circuit through which the silicon controlled rectifier gate switch output potential signal is applied across the gate-cathode electrodes of the corresponding cycloconverter silicon controlled rectifier in a forward polarity relationship, means for producing a sensing potential signal of a magnitude proportional to the magnitude of the anode-cathode potential across said corresponding cycloconverter silicon controlled rectifier, at least one switching transistor having collector and emitter electrodes connected in series in said gate signal circuit and a base electrode, means for applying said silicon controlled rectifier gate switch output potential gate signal across said base-emitter electrodes of said switching transistor in a forward polarity relationship, and means for applying said sensing potential across said base-emitter electrodes of said switching transistor in an inverse polarity relationship whereby said switching transistor is maintained not conductive when the forward anode-cathode potential across said corresponding cycloconverter silicon controlled rectifier is of a magnitude greater than a predetermined maximum.

4. In a cycloconverter system, a gate signal inhibit circuit for maintaining the gate signal circuit of a corresponding cycloconverter silicon controlled rectifier interrupted when the anode-cathode potential across the silicon controlled rectifier is of a magnitude greater than a predetermined maximum comprising in combination with a silicon controlled rectifier gate switch of the type which produces an output potential gate signal, a corresponding cycloconverter silicon controlled rectifier having anode, cathode and gate electrodes and a gate signal circuit through which the silicon controlled rectifier gate switch output potential signal is applied across the gate-cathode electrodes of the corresponding cycloconverter silicon controlled rectifier in a forward polarity relationship, first and second resistors, means for connecting said first and second resistors in series across said anode-cathode electrodes of said corresponding cycloconverter silicon controlled rectifier, at least one switching transistor having collector and emitter electrodes connected in series in said gate signal circuit and a base electrode, means for applying said silicon controlled rectifier gate switch output potential gate signal across said base-emitter electrodes of said switching transistor in a forward polarity relationship, and means for connecting said base electrode of said switching transistor to the junction between said first and second resistors.

* * * * *